(12) United States Patent
Doan et al.

(10) Patent No.: US 6,421,661 B1
(45) Date of Patent: *Jul. 16, 2002

(54) HIERARCHICAL QUERY SYNTAX FOR INQUIRING AND SELECTING AMONG DATABASE OBJECTS

(75) Inventors: Bach Dinh Doan, San Jose; Shyh-Mei Fang Ho, Cupertino, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/299,781

(22) Filed: Apr. 26, 1999

(51) Int. Cl.⁷ .................................................. G06F 17/30
(52) U.S. Cl. ................................. 707/3; 707/103
(58) Field of Search ............................ 707/3, 1, 4, 100, 707/102, 103, 2

(56) References Cited

U.S. PATENT DOCUMENTS 5,778,379 A * 7/1998 Blackman et al. .......... 707/103
6,192,369 B1 * 2/2001 Doan et al. ................. 707/103

* cited by examiner

Primary Examiner—Sanjiv Shah
(74) Attorney, Agent, or Firm—Gates & Cooper LLP

(57) ABSTRACT

A method, apparatus, and article of manufacture for accessing a hierarchical database. The database is modeled into an objects framework, wherein the objects framework corresponds to application views, data structures, and data defined and stored in the database, as well as message queues. Data is retrieved from the objects framework in response to a query request received from an application program, wherein the query request conforms to a syntax that supports one or more data types used by the database system.

32 Claims, 5 Drawing Sheets

FIG. 5

```
SELECT CLASS
FROM DBVIEWNAME
WHERE CLASS.FIELD REL_OP %W  LOG_OP CLASS.FIELD REL_OP %W .
```

HIERARCHICAL QUERY SYNTAX FOR INQUIRING AND SELECTING AMONG DATABASE OBJECTS

CROSS-REFERENCE TO RELATED APPLICATIONS

This application is a continuation-in-part of co-pending and commonly assigned Utility application Ser. No. 09/097,376, filed on Jun. 15, 1998, by Bach Dinh Doan, Jenny Y. Liao, and Shyh-Mei F. Ho, entitled "OBJECT-ORIENTED PARADIGM FOR ACCESSING TRANSACTIONAL REQUESTS BY MODELING I/O MESSAGE QUEUES INTO AN OBJECT FRAMEWORK," issued on Feb. 20, 2001, as U.S. Pat. No. 6,192,369, which application is incorporated by reference herein.

This application is related to the following co-pending and commonly assigned patent applications:

Utility application Ser. No. 09/118,130, entitled "COMMAND LINE INTERFACE FOR CREATING BUSINESS OBJECTS FOR ACCESSING A HIERARCHICAL DATABASE," filed on Jul. 16, 1998, by Mark A. Bach, Kyle Jeffrey Charlet, Shyh-Mei Fang Ho, Kevin M. McBride, Huey Moncrief Rowe-Anderson, Thomas Beavers Sanders, and Thomas Arthur Vogel, now U.S. Pat. No. 6,141,660, issued Oct. 31, 2000, attorney's docket number ST9-98-012;

Utility application Ser. No. 09/097,376, entitled "AN OBJECT-ORIENTED PARADIGM FOR ACCESSING TRANSACTIONAL REQUESTS BY MODELING I/O MESSAGE QUEUES INTO AN OBJECT FRAMEWORK," filed on Jun. 15, 1998, by Bach Dinh Doan, Jenny Y. Liao, and Shyh-Mei F. Ho, now U.S. Pat. No. 6,192,369, issued Feb. 20, 2001, attorney's docket number ST9-98-056;

Utility application Ser. No. 09/070,071, entitled "EXECUTION PARADIGM FOR ACCESSING HIERARCHICAL DATA USING AN OBJECT FRAMEWORK," filed on Apr. 30, 1998, by Kenneth R. Blackman, Shyh-Mei F. Ho, and Thomas Beavers Sander, now U.S. Pat. No. 6,202,069, issued Mar. 13, 2001, attorney's docket number ST9-98-005;

Utility application Ser. No. 09/070,274, entitled "A GENERIC EXECUTION MODEL FOR ISOLATING APPLICATIONS FROM UNDERLYING DATABASES," filed on Apr. 30, 1998, by Kenneth R. Blackman, Shyh-Mei F. Ho, and Thomas Beavers Sander, now U.S. Pat. No. 6,360,229, issued Mar. 19, 2002, attorney's docket number ST9-98-006;

Utility application Ser. No. 09/070,528, entitled "AN OBJECT-ORIENTED PROGRAMMING MODEL FOR ACCESSING HIERARCHICAL DATABASES," filed on Apr. 30, 1998, by Bach Dinh Doan and Shyh-Mei F. Ho, attorney's docket number ST9-98-007;

Utility application Ser. No. 09/070,227, entitled "GENERATING AN INTERNET APPLICATION FOR ACCESSING A HIERARCHICAL DATABASE," filed on Apr. 30, 1998, by Attila J. Fogarasi, Shyh-Mei F. Ho, Wai-Yee D. Ling, and Kevin M. McBride, now U.S. Pat. No. 6,128,619, issued Oct. 3, 2000, attorney's docket number ST9-98-028;

Utility application Ser. No. 09/042,238, entitled "USER INTERFACE FOR CREATING PROGRAM SPECIFICATIONS FOR ACCESSING DATABASE PERSISTENT OBJECTS," filed on Mar. 13, 1998, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, now U.S. Pat. No. 6,128,622, issued Oct. 3, 2000, attorney's docket number ST9-97-126, which claims the benefit under 35 U.S.C. § 119(e) of Provisional application Ser. No. 60/067,292, entitled "USER INTERFACE FOR CREATING PROGRAM SPECIFICATIONS FOR ACCESSING DATABASE PERSISTENT OBJECTS," filed on Nov. 26, 1997, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, attorney's docket number ST9-97-126;

Utility application Ser. No. 08/949,638, entitled "USER INTERFACE FOR CREATING CLASS DEFINITIONS AND IMPLEMENTATIONS FOR DATASTORE PERSISTENT OBJECTS," filed on Oct. 14, 1997, by Mark Alan Bach, Shyh-Mei F. Ho, Kevin Michael McBride, H. Moncrief Rowe-Anderson and Thomas Beavers Sander, now U.S. Pat. No. 5,924,101, issued Jul. 13, 1999, attorney's docket number ST9-97-098;

Utility application Ser. No. 08/775,606, entitled "IMS/WWW MAPPING SYSTEM," filed on Dec. 31, 1996, by Mark Alan Bach, In Ha Chung, Judith E. Hill, Steve T. Kuo, Theresa H. Lai, Allen G. Lee, and Richard S. Uyehara, now U.S. Pat. No. 5,781,739, issued Jul. 14, 1998, attorney's docket number ST9-96-068;

Utility application Ser. No. 09/074,928, entitled "FRAMEWORK FOR OBJECT-ORIENTED ACCESS TO NON-OBJECT-ORIENTED DATASTORES," filed on May 6, 1998, by Kenneth R. Blackman and Jack L. Howe III, now U.S. Pat. No. 6,081,808, issued Jun. 27, 2000, attorney's docket number ST9-96-038V, which is a continuation of Utility application Ser. No. 08/736,762, entitled "FRAMEWORK FOR OBJECT-ORIENTED ACCESS TO NON-OBJECT-ORIENTED DATASTORES," filed on Oct. 25, 1996, by Kenneth R. Blackman and Jack L. Howe III, now U.S. Pat. No. 5,799,313, issued Aug. 25, 1998, attorney's docket number ST9-96-038;

Utility application Ser. No. 08/736,763, entitled "METHOD FOR REPRESENTING NON-OBJECT-ORIENTED DATASTORES USING A COLLECTION OF COLLECTIONS DATA MODEL," filed on Oct. 25, 1996, by Kenneth R. Blackman and Jack L. Howe III, now U.S. Pat. No. 5,794,248, issued Aug. 11, 1998, attorney's docket number ST9-96-039;

Utility application Ser. No. 09/074,929, entitled "METHOD FOR THE INCREMENTAL PRESENTATION OF NON-OBJECT-ORIENTED DATASTORES USING AN OBJECT-ORIENTED QUERYABLE DATASTORE COLLECTION," filed on May 6, 1998, by Kenneth R. Blackman and Jack L. Howe III, now U.S. Pat. No. 6,078,927, issued Jun. 20, 2000, attorney's docket number ST9-96-040V, which is a continuation of Utility application Ser. No. 08/738,294, entitled "METHOD FOR THE INCREMENTAL PRESENTATION OF NON-OBJECT-ORIENTED DATASTORES USING AN OBJECT-ORIENTED QUERYABLE DATASTORE COLLECTION," filed on Oct. 25, 1996, by Kenneth R. Blackman and Jack L. Howe III, now U.S. Pat. No. 5,781,907, issued Jul. 14, 1998, attorney's docket number ST9-96-040;

Utility application Ser. No. 08/738,104, entitled "QUERY SYNTAX FOR ACCESSING NON-RELATIONAL, NON-OBJECT-ORIENTED DATASTORES," filed on Oct. 25, 1996, by Kenneth R. Blackman and Jack. L. Howe III, now U.S. Pat. No. 5,778,379, issued Jul. 7, 1998 attorney's docket number ST9-96-041;

Utility application Ser. No. 08/738,082, entitled "A QUERY PARSER FOR ACCESSING NON-RELATIONAL, NON-OBJECT-ORIENTED DATASTORES," filed on Oct. 25, 1996, by Kenneth R. Blackman and Jack L. Howe III, now U.S. Pat. No. 5,778,379, issued Jul. 7, 1998, attorney's docket number ST9-96-042;

Utility application Ser. No. 08/738,330, entitled "METHOD FOR USING A DATASTORE CURSOR FOR THE INCREMENTAL PRESENTATION OF QUERY RESULTS WHEN TRAVERSING IMPLIED COLLECTIONS IN NON-OBJECT-ORIENTED DATASTORES," filed on Oct. 25, 1996, by Kenneth R. Blackman and Jack L. Howe III, now U.S. Pat. No. 5,787,436, issued Jul. 28, 1998, attorney's docket number ST9-96-043;

Utility application Ser. No. 09/074,208, entitled "METHOD FOR REPRESENTING DATA FROM NON-RELATIONAL, NON-OBJECT-ORIENTED DATASTORES AS QUERYABLE DATABASE PERSISTENT OBJECTS," filed on May 7, 1998, by Kenneth R. Blackman and Jack L. Howe III, now U.S. Pat. No. 6,185,572, issued Feb. 6, 2001, attorney's docket number ST9-96-044V, which is a continuation of Utility application Ser. No. 08/736,759, entitled "METHOD FOR REPRESENTING DATA FROM NON-RELATIONAL, NON-OBJECT-ORIENTED DATABASES AS QUERYABLE DATABASE PERSISTENT OBJECTS," filed on Oct. 25, 1996, by Kenneth R. Blackman and Jack L. Howe III, now U.S. Pat. No. 5,794,247, issued Aug. 11, 1998, attorney's docket number ST9-96-044;

Utility application Ser. No. 08/736,764, entitled "METHOD FOR ENCAPSULATING DATA FROM NON-OBJECT-ORIENTED DATASTORES AS DATABASE PERSISTENT OBJECTS," filed on Oct. 25, 1996, by Kenneth R. Blackman and Jack L. Howe III, now U.S. Pat. No. 5,765,161, issued Jun. 9, 1998, attorney's docket number ST9-96-047;

Utility application Ser. No. 08/738,103, entitled "METHOD FOR USING QUERYABLE PERSISTENT IDENTIFIERS TO LOCATE DATA FOR DATASTORE PERSISTENT OBJECTS IN NON-OBJECT-ORIENTED DATASTORES," filed on Oct. 25, 1996, by Kenneth R. Blackman and Jack L. Howe III, now U.S. Pat. 5,765,163, issued Jun. 9, 1998, attorney's docket number ST9-96-048;

Utility application Ser. No. 08/736,983, entitled "A METHOD FOR INTERFACING QUERYABLE DATASTORE PERSISTENT OBJECTS TO NON-RELATIONAL, NON-OBJECT-ORIENTED DATASTORES," filed on Oct. 25, 1996, by Kenneth R. Blackman and Jack L. Howe III, now U.S. Pat. No. 5,761,671, issued Jun. 2, 1998, attorney's docket number ST9-96-049;

Utility application Ser. No. 09/074,935, entitled "METHOD FOR MANAGING QUERYABLE DATABASE PERSISTENT OBJECTS AND QUERYABLE DATASTORE COLLECTIONS IN AN OBJECT-ORIENTED ENVIRONMENT," filed on May 6, 1998, by Kenneth R. Blackman and Jack L. Howe III, now U.S. Pat. No. 5,983,235, issued Nov. 9, 1999, attorney's docket number ST9-96-051V, which is a continuation of Utility application Ser. No. 08/736,952, entitled "A METHOD FOR MANAGING QUERYABLE DATASTORE PERSISTENT OBJECTS AND QUERYABLE DATASTORE COLLECTIONS IN AN OBJECT-ORIENTED ENVIRONMENT," filed on Oct. 25, 1996, by Kenneth R. Blackman and Jack L. Howe III, now U.S. Pat. No. 5,765,162, issued Jun. 9, 1998, attorney's docket number ST9-96-051;

Utility application Ser. No. 08/736,922, entitled "A METHOD FOR CAPTURING AND CATALOGING DATASTORE CHARACTERISTICS TO DEFINE DATASTORE PERSISTENT OBJECTS," filed on Oct. 25, 1996, by Kenneth R. Blackman and Jack L. Howe III, now U.S. Pat. No. 5,809,508, issued Sep. 15, 1998, attorney's docket docket number ST9-96-050;

Utility application Ser. No. 08/047,786, entitled "METHOD FOR CATALOGING DATABASE CHARACTERISTICS AND DEFINING AND GENERATING DATABASE PERSISTENT OBJECTS," filed on Mar. 25, 1998, by Kenneth R. Blackman and Jack L. Howe III, now U.S. Pat. No. 6,223,184, issued Apr. 24, 2001, attorney's docket number ST9-96-045Z, which is a continuation of Utility application Ser. No. 08/736,765, entitled "A METHOD FOR CATALOGING DATASTORE CHARACTERISTICS AND DEFINING AND GENERATING DATASTORE PERSISTENT OBJECTS," filed on Oct. 25, 1996, by Kenneth R. Blackman and Jack L. Howe III, now U.S. Pat. No. 5, 737, 597, issued Apr. 7, 1998, attorney's docket number ST9-96-045;

Utility application Ser. No. 08/736,922, entitled "A METHOD FOR CAPTURING AND CATALOGING DATASTORE CHARACTERISTICS TO DEFINE DATASTORE PERSISTENT OBJECTS," filed on Oct. 25, 1996, by Kenneth R. Blackman and Jack L. Howe III, now U.S. Pat. No. 5,809,508, issued Sep. 15, 1998, attorney's docket number ST9-96-050;

Utility application Ser. No. 08/738,102, entitled "A METHOD FOR CAPTURING AND CATALOGING SPECIFICATIONS FOR DATASTORE PERSISTENT CLASSES," filed on Oct. 25, 1996, by Kenneth R. Blackman and Jack L. Howe III, now U.S. Pat. No. 5,737,598, issued Apr. 7, 1998, attorney's docket number ST9-96-036;

Utility application Ser. No. 09/074,247, entitled "A METHOD FOR USING A NON-OBJECT-ORIENTED DATASTORE AS A GENERIC PERSISTENT DATASTORE FOR PERSISTENT OBJECTS," filed on May 7, 1998, by Kenneth R. Blackman and Jack L. Howe III, now U.S. Pat. No. 6,219,673, issued Apr. 17, 2001, attorney's docket number ST9-96-046V, which is a continuation of Utility application Ser. No. 08/738,105, entitled "A METHOD FOR USING A NON-OBJECT-ORIENTED DATASTORE AS A GENERIC PERSISTENT DATABASE FOR PERSISTENT OBJECTS," filed on Oct. 25, 1996, by Kenneth R. Blackman and Jack L. Howe III, now U.S. Pat. No. 5,809,509, issued Sep. 15, 1998, attorney's docket number ST9-96-046; and Utility application Ser. No. 08/736,761, entitled "A METHOD FOR CAPTURING AND CATALOGING PROGRAM CHARACTERISTICS FOR THE USAGE OF DATASTORE PERSISTENT CLASSES," filed on Oct. 25, 1996, by Kenneth R. Blackman and Jack L. Howe III, now U.S. Pat. No. 5,764,979, issued on Jun. 9, 1998, attorney's docket number ST9-96-037;

all of which application are incorporated by reference here.

BACKGROUND OF THE INVENTION

1. Field of the Invention

The present invention relates generally to computerized methods for accessing databases, and in particular, to a computerized object-oriented method for inquiring and accessing hierarchical databases using a specialized syntax.

2. Description of Related Art

It is well known in the art to use database management systems, such as IBM's IMS™ (Information Management System) database management system, to manage computerized databases. Indeed, IMS™ has been used for decades and remains in use today. Currently, there is a need to access such "legacy" databases using application programs developed by object-oriented programming systems (OOPS). However, there are few tools available to assist OOPS developers.

One method for allowing object-oriented application programs to access data in an IMS™ database is through transaction wrappering, implemented in such products such as IBM's VisualAge™ IMS Connection. Transaction wrappering creates a class having methods that retrieve data from the IMS™ database, create an object embodying the retrieved data, and manipulate the object in an object-oriented application program. The problem with this approach is that each object-oriented application requires substantial additional coding, both object-oriented and non-object-oriented, before it is able to access the data in the IMS™ database.

Another approach to accessing data in a non-relational, non-object-oriented database is to translate the non-relational database to a relational database, and use existing object-oriented programming techniques developed for relational databases to access the data therein. The problem with this approach is that non-relational data, such as the hierarchical data found in an IMS™ database, does not map well to a relational database.

In addition, hierarchical data may not map well to object-oriented application programs. For example, hierarchical database segment layouts in an IMS™ database are defined in copybooks via different languages, e.g., COBOL, PL/1, Assembly, etc. The data types in copybooks describing hierarchical input and output data can be characters, integers, doubles, shorts, floats, arrays, structures, occurs, packed decimals, etc. Manipulating these different data types in object-oriented application programs often presents difficulties and challenges. Some data types, e.g., packed decimals or binary integers, often are misrepresented in C++ language. For example, C/C++ language terminates a string by a null character and a packed decimal data may contain a null as part of its data.

Thus, there is a need in the art for improved techniques for accessing hierarchical data using object-oriented frameworks.

SUMMARY OF THE INVENTION

To overcome the limitations in the prior art described above, and to overcome other limitations that will become apparent upon reading and understanding the present specification, the present invention discloses a method, apparatus, and article of manufacture for accessing a hierarchical database. The database is modeled into an objects framework, wherein the objects framework corresponds to application views, data structures, and data defined and stored in the database, as well as message queues. Data is retrieved from the objects framework in response to a query request received from an application program, wherein the query request conforms to a syntax that supports one or more data types used by the database system.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 5 is a diagram that illustrates the syntax for creating a DL/I query string according to the preferred embodiment of the present invention.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention introduces a hierarchical query syntax for inquiring and selecting database objects from hierarchical databases, such as an IMS™ database, by modeling the database into an objects framework and providing the mechanisms that allow object-oriented application programs to access the database data using standard tools, such as the DL/I™ query language for the IMS™ database. The objects framework instantiates IMS™ data objects upon demand from application programs and manages those objects from creation to deletion. Further, the objects framework uses these objects to dynamically construct DL/I™ calls from application program requests.

The present invention defines a query syntax for accessing hierarchical databases. This query syntax not only facilitates the selection of data objects from a hierarchical database, it also supports a complete set of data types which are currently used by existing IMS™ applications. The present invention allows easy expansion to new data types to be defined in different languages (i.e., COBOL, C, PL/1, Assembler, etc.). The IMS™ object-oriented application programs use this query syntax to inquiry a hierarchical database to provide object access to an IMS™ database.

Hierarchical database segment layouts are defined in copybooks via different languages (e.g., COBOL, C, PL/1, Assembler, etc.). The data types in copybooks describe various data types, such as characters, strings, integers, doubles, shorts, floats, arrays, structures, packed decimals, etc. Manipulating these different data types often presents difficulties and challenges.

The present invention defines a DL/I™ query string containing several clauses that an object-oriented application program can use to select data objects on which DL/I™ operations (i.e., retrieve, update, insert, and delete) can be performed in a hierarchical database. One of the clauses in the DL/I™ query string comprises a "data type string" that allows segment field values to be specified to further qualify the search, wherein the data type string indicates the type of data value. Using the data type string, the present invention is capable of supporting any number of different data types that may be found in existing hierarchical database definitions.

Thus, the present invention offers improved IMS™ application programming productivity through the use of object-oriented programming techniques. Moreover, the present invention eliminates the need for complicated IMS™ transactions and DL/I™ programming.

Hardware Environment

Figure 1:
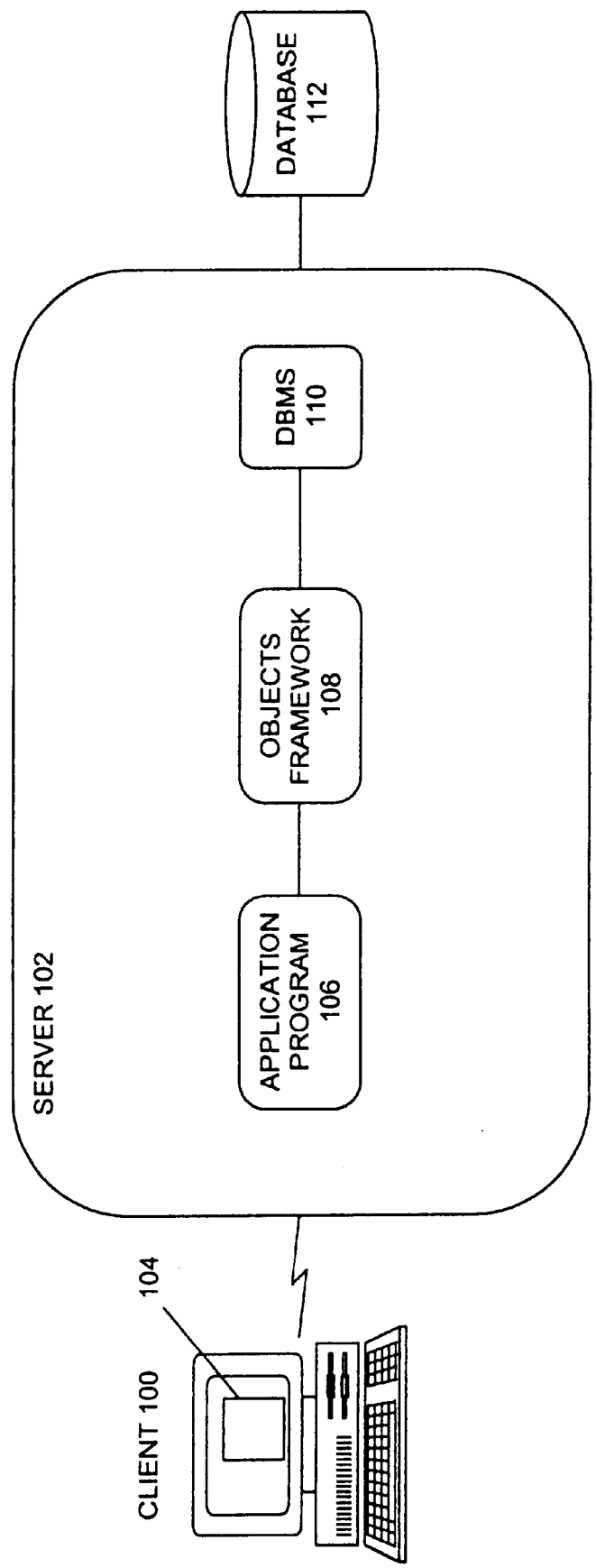
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A client computer 100 communicates with a server computer 102. Both the client computer 100 and the server computer 102 are typically comprised of one or more processors, random access memory (RAM), read-only memory (ROM), and other components such as data storage devices and data communications devices.

The client computer 100 executes one or more computer programs 104 operating under the control of an operating system. These computer programs 104 transmit requests to the server computer 102 for performing various functions and receive data from the server computer 102 in response to the requests.

The server computer 102 also operates under the control of an operating system, and executes one or more computer programs 106, 108, and 110. These computer programs 106, 108, and 110 receive requests from the client computer 100 for performing various functions and transmit data to the client computers 100 in response to the requests.

The server computer 102 manages one or more databases 112 stored on one or more data storage devices (such as a fixed or hard disk drive, a floppy disk drive, a CD-ROM drive, a tape drive, or other device). In a preferred embodiment, the database 112 is managed by the IMS™ database management system (DBMS) offered by IBM Corporation. Those skilled in the art will recognize, however, that the present invention may be applied to any database and associated database management system.

The present invention is generally implemented using five major components executed by client computers 100 and server computers 102, including a client program 104, object-oriented application program 106, objects framework 108, database management system (DBMS) 110 and database 112, wherein each of these components comprise instructions and/or data. The client program 104 provides a user interface, the object-oriented application program 106 performs application functions, the objects framework 108 materializes data retrieved from the database 112 as objects, and the database management system 110 controls access to the database 112.

Generally, these instructions and/or data 104–112 are all tangibly embodied in or retrievable from a computer-readable device, medium, or carrier, e.g., a data storage device, a data communications device, etc. Moreover, these instructions and/or data, when read, executed, and/or interpreted by the client computer 100 and/or server computer 102, causes the client computer 100 and/or server computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Objects Framework Model

Figure 2:
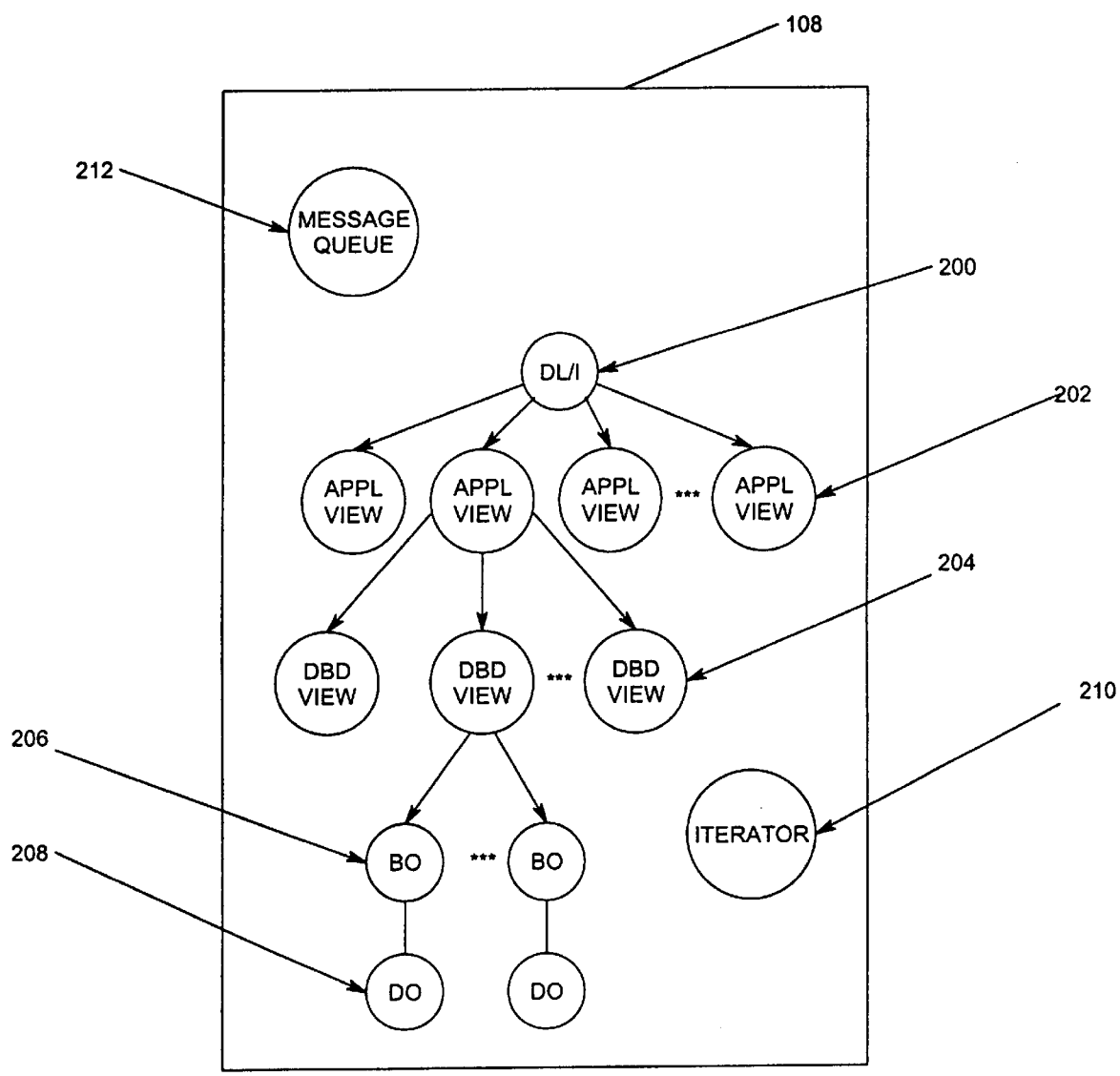
FIG. 2 is a block diagram illustrating a layered processing model used in the objects framework according to the present invention.

FIG. 2 is a block diagram illustrating a layered processing model provided by the objects framework 108 according to the present invention. The layered processing model corresponds to the application views, database definitions, and data defined and stored in an IMS™ database management system, as well as IMS™ Transaction Manager™ message queues.

The objects framework 108 comprises a C++ class library that interfaces to the application program 106. The application program 106 dynamically loads previously defined objects into the objects framework 108 to access the database 112 during execution time. The objects loaded into the objects framework 108 include a DL/I™ object 200, one or more applView objects 202, one or more dbdView objects 204, one or more business objects (BOs) 206, one or more data objects (DOs) 208, an iterator object 210, and one or more message queue objects 212.

The application program 106 first loads the objects framework 108 class library. The objects framework 108 receives IMS™ transaction requests from a requestor via one or more instantiated message queue objects 212. The objects framework 108 then dynamically instantiates a DL/I™ object 200, one applView object 202, and one dbdView object 204. The objects framework 108 also dynamically loads the class library for the BOs 206 and DOs 208 requested by the application program 106 to create an iterator object 210. The iterator object 210 instantiates the BOs 206 and their corresponding DOs 208 during execution. After execution, responses are returned to the requestor as IMS™ transaction responses via the instantiated message queue objects 212.

All the class objects, except the iterator class 210 and the message queue class 212, are organized into a tree structure to represent the hierarchical structure of data retrieved from the database 112. In the preferred embodiment, the tree structure ensures that there is exactly one path through the hierarchy to each object and consequently exactly one identity, i.e., segment occurrence, for an object.

Each of the objects in the tree structure encapsulates a logical unit of data retrieved from the database 112 and includes member functions for manipulating the encapsulated data. The structure and member functions of these various objects are described in more detail below.

DL/I Object

In the preferred embodiment, the database 112 is an IMS™ database 112, which is an "application views database". The DL/I™ object 200 is the root of the objects framework 108, and thus is a root for a collection of application views (applView objects 202) in the IMS™ database 112. Thus, the objects framework 108 provides for multiple application views of the database 112 in a layered processing model.

applView Object

Each applView object 202 represents an "application (appl) view" of the IMS™ database 112. Each applView object 202 contains and manages a collection of dbdView objects 204.

dbdView Object

Each dbdView object 204 represents a "database description (dbd) view" associated with a given "application view" of the IMS™ database 112. Each dbdView object 204 includes information about the structure of the segments in the IMS™ database 112 and the record layouts, including formatting information for the records in the database 112. The dbdView objects 204 also define the hierarchy to help locate segments for the database 112. In the objects framework 108, each dbdView object 204 contains and manages a collection of data objects (DOs) 208 and business objects (BOs) 206.

Business Objects and Data Objects

The IMS™ database 112 is comprised of a collection of segment types, and each segment type contains a collection of segment occurrences. A DO 208 class represents each segment type and each segment occurrence is represented by an instance of the class, i.e., a DO 208. Thus, the DOs 208 provide a direct mapping of the data within each segment occurrence. Moreover, the object-oriented application program 106 can directly access the data of the segment occurrence by interacting with the DO 208 via the objects framework 108 to perform the necessary operations on the database 112.

In addition, a BO 206 may be instantiated with a DO 208 to provide business logic for the application program 106. In such an embodiment, the application program 106 accesses the business logic via the BO 206, which in turn invokes the methods of its corresponding DO 208 to perform the necessary operations on the database 112, to manage its essential state data. Thus, the DO 208 isolates the BO 206 from the specifics of the database 112. With the BO/DO model, customers can easily separate business logic from the physical data access logic to accommodate more diversified business needs. Furthermore, because of the nature of the separation of BO 206 and DO 208, the objects framework 108 can be easily extended to other non-hierarchical datastores, e.g. DB2™.

Iterator Object

In the objects framework 108, the application program 106 uses a DL/I™ query string to access the IMS™ database 112. The application program 106 first instantiates a desired applView object 202. If the associated DL/I™ object 200 has not been instantiated yet, this also results in its instantiation as the root of the objects framework 108 and the root for the collection of applView objects 202 in the IMS™ database 112. The application program 106 then provides the DL/I™ query string to an "evaluate" method of the applView object 202, and the applView object 202 builds a DL/I™ segment search argument list based on the values within the DL/I™ query string.

The application program 106 then creates the iterator object 210 that is used to point to an incrementally-materialized collection of BOs 206 and DOs 208 that meet the search criteria specified in the DL/I™ query string. The "evaluate" method of the applView object 202 reads the DL/I™ query string and sets a pointer in the iterator object 210 to point to the collection of BOs 206 and DOs 208 that meet the DL/I™ segment search criteria.

A "next" method of the iterator object 210 is invoked to instantiate each BO 206 and/or DO 208 from the database 112, wherein the resulting state data of the BO 206 and DO 208 are cached in the memory of the server computer 102. Using the pointer and "next" method of the iterator object 202, the application program 106 can iterate through a collection of BOs 206 and/or DOs 208 to materialize one BO 206 and/or DO 208 after the other in the memory of the server computer 102.

Each BO 206 and DO 208 class contains both "get" and "set" methods associated for each class attribute. The application program 106 can then retrieve or update the attributes of a DO 208 by invoking these methods. Preferably, no I/O operations are performed at the invocation of these "get" and "set" methods, and all state data is changed in memory only until a commit occurs.

As described above, the BOs 206 are used by the application program 106 to perform needed business logic on the associated DOs 208. In addition, the application program 106 can perform DL/I™ operations (e.g., retrieve, update, delete and insert) using methods of the BOs 206. The BO 206 will, in turn, invoke the methods of its corresponding DO 208 to perform actual DL/I calls.

The following methods exemplify the BO 206 methods that allow the application program 106 to retrieve a DO 208 from the database 112, to update state data for the DO 208 in the database 112, to add a new instance of the DO 208 to the database 112, or to delete a DO 208 from the database 112:

RetrieveFromDB( )
UpdateToDB( )
InsertToDB( )
DeleteFromDB( )

In a preferred embodiment, only the above four methods will result in actual I/O operations on the database 112.

Message Queue Object

The message queue class 212 models IMS™ Transaction Managers input and output message queues as objects. The message queue class includes, among others, "retrieveMsg" and "writeMsg" methods that allow transactional application programs 106 to retrieve messages from an IMS™ message queue, and then write responses to an originator via the same IMS™ message queue, and/or to another destination via other IMS™ message queues. Both request and response buffers are constructed dynamically by the message queue objects.

The message queue objects 212 support both conversational and non-conversational application programs 106 to allow the application programs 106 to selectively access scratch pad area (SPA) data in conversational mode. The message queue objects 212 also allow an output message to be displayed on a formatted screen by optionally supporting the message output descriptor (MOD) on the writeMsg method.

The object message objects 212 are capable of supporting multiple message segments. Request buffers are allocated and created dynamically upon demand by application programs 106. Moreover, default sizes are provided for both SPA data and input message data. Therefore, if a buffer size is not specified by the application program 106, the maximum default size will be used.

The same message request object can also be used to write SPA data and output message data back to the originator. However, output responses can also be written to a different destination by creating a separate message queue object with the specified destination.

Programming Model for Batch applications

Following is a sample object-oriented batch application program 106 according to the present invention:

```
// application program
main( ) {
//instantiate an applView object and give it a PSB (program specification
//block) name.
applView_SSM applView("applViewname"); (1)
//
// Invoke the applView object's evaluate method, using a DL/I™ query
// string. If processing is successful, the evaluate method returns a pointer to
// an iterator object; otherwise, a null pointer is returned.
iterator *itr=applView.evaluate(&msg,
    "SELECT doClassNameC
    FROM databaseViewName
    WHERE doClassNameA.keyname=%x,
       doClassNameB.keyname=%x,
       doClassNameC.keyname=%x", val1, val2, val3);
// The iterator object's next method iterates through this collection of data
// objects and instantiates one data object each time by retrieving data from
// the IMS™ database and storing that data in a data object in memory. The
// next method then returns a pointer to a data object.
DO*pObj=itr->next( );
//
// A data object contains persistence methods (Update, Retrieve, Delete,
// Insert) in order to perform DL/I™ operations on the IMS™ database that
// contains the segment upon which the data object is built.
pObj->UpdateToDB( );
pObj->RetrieveFromDB( );
pObj->DeleteFromnDB( );
//
// Use the iterator object's newObject method to create a new data object for
// insertion.
DO*pObj=itr->newObject( );
//
// Add the new object to the IMS™ database using the Insert persistence
// method of the new data object
pObj->InsertToDB( );
}
```

Programming Model for Transactional Applications

Following is a sample object-oriented transactional application program 106 according to the present invention. The transactional application program 106 can be either conversational or nonconversational.

```
// application program
main( )
{
// return code
long rc;
// instantiate a message queue object
msgQueue mq (conversational_mode, input_length,
    spa_length)
//
// if conversational mode, then create a SPA request buffer and
// retrieve data from the SPA
If conversational_mode=1
{
    rc=mq.retrieveMsg(SpaBuffer);
}
//
// create message buffer and retrieve data from input message queue
rc=mq.retrieveMsg(MessageBuffer);
//
// parse the input for an application view, query string,
// and/or desired operation
process_input (MessageBuffer);
// Invoke the applView object's evaluate method, using a DL/I™ query string.
// If processing is successful, the evaluate method returns a pointer to an
// iterator object; otherwise, a null pointer is returned.
iterator *itr=applView.evaluate(&msg,
    "SELECT doClassNameC
    FROM databaseViewName
    WHERE doClassNameA.keyname=%x,
    doClassNameB.keyname=%x,
    doClassNameC.keyname=%x", val1,val2,val3);
// The iterator object's next method iterates through this collection of data
// objects and instantiates one data object each time by retrieving data from
// the IMS database and storing that data in a data object in memory. The
// next method then returns a pointer to a data object.
DO*pObj=itr->next( );
//
// A data object contains persistence methods (Update, Retrieve, Delete,
// Insert) in order to perform DL/I™ operations on the IMS database that
// contains the segment upon which the data object is built.
pObj->UpdateToDB( );
pObj->RetrieveFromDB( );
pObj->DeleteFromDB( );
//
// Use the iterator object's newObject method to create a new data object for
// insertion.
DO* pObj=itr->newObject( );
//
// Add the new object to the IMS™ database using the Insert persistence
// method of the new data object
```

```
pObj->InsertToDB( );
//
// if conversational mode, then write SPA request buffer
If conversational_mode=1
{
   rc=mq.sendMsg(SpaBuffer);
}
//
// send output data to the original message queue
rc=mq.sendMsg(MessageBuffer, output_length);
// instantiate alternative message queue object
msgQueue alternative_mq (conversational_mode,
   input_length, spa_length)
// send output data to the alternative message queue
rc =alternative_mq.sendMsg(MessageBuffer, output_
   length);
}
```

Logic of the Application Program

Figure 3:
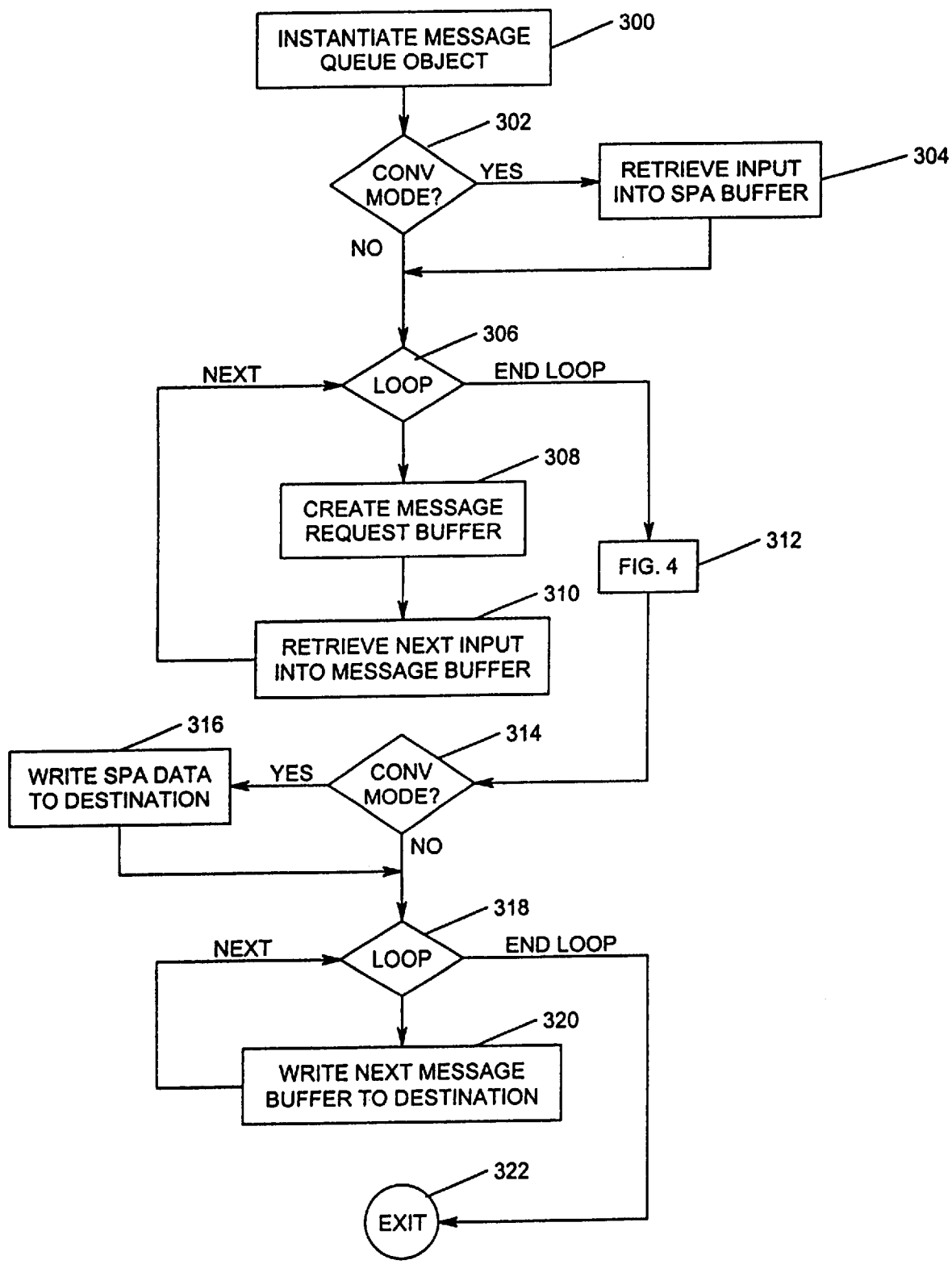
FIGS. 3 and 4 together are a flowchart illustrating the steps performed by the application program and objects framework according to the present invention.
Figure 4:
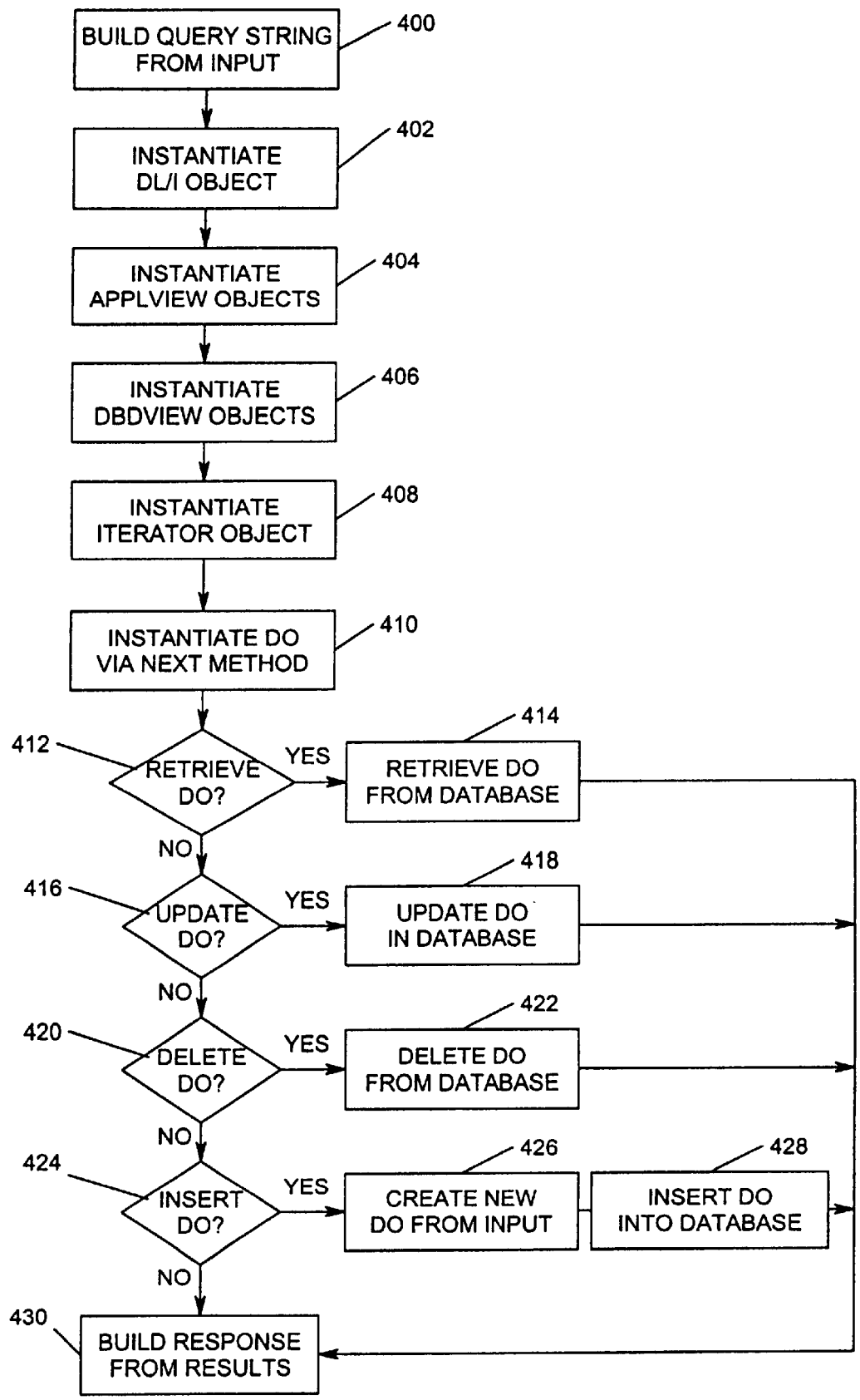

FIGS. 3 and 4 together are a flowchart illustrating the steps performed by the application program 106 and objects framework 108 according to the present invention. Specifically, FIG. 3 illustrates the steps performed by a transactional application program 106 and FIG. 4 illustrates the steps performed by both a transactional and batch application program 106.

Referring to FIG. 3, Block 300 represents the application program 106 instantiating a message queue object 212 for the originator (e.g., terminal or program) in the memory of the server computer 102.

Block 302 is a decision block that represents the application program 106 determining whether the application is in conversational mode. If so, control transfers to Block 304; otherwise, control transfers to Block 306.

Block 304 represents the application program 106 creating a SPA buffer in the memory of the server computer 102 and retrieving input from the originator into the SPA buffer via the message queue object 212.

Blocks 306–310 are a loop for reading multiple message segments of an input message from the message queue object 212, wherein request buffers are allocated and created dynamically by the application program 106 in the memory of the server computer 102. Block 308 represents the application program 106 dynamically creating one or more message request buffers using the message queue object 212 and Block 310 represents the application program 106 retrieving one or more message segments from the message queue object 212 into the message request buffer.

After reading all the message segments, control transfers to Block 312, which represents the application program 106 processing the input message. This processing is further described in conjunction with FIG. 4. After the processing is completed, control transfers to Block 314.

Block 314 is a decision block that represents the application program 106 determining whether it is operating in conversational mode. If so, control transfers to Block 316; otherwise, control transfers to Block 318.

Block 316 represents the application program 106 writing the SPA buffer to a destination via the message queue object 212.

Blocks 318–320 represent a loop for writing multiple message segments to the destination via its message queue object 212. The destination could be the same as the originator (and thus use the same message queue object 212) and/or it could be different from the originator (and thus use a different message queue object 212). Block 320 represents the application program 106 writing one or more message segments to the destination's message queue object 212.

Finally, Block 322 represents the end of the logic.

Referring to FIG. 4, Block 400 represents the application program 106 parsing the input message, and dynamically constructing a DL/I™ query string based on the user input.

Block 402 represents the DL/I™ object 200 of the objects framework 108 being instantiated in the memory of the server computer 102. Usually, this occurs either when the objects framework 108 is loaded or when the application program 106 first requests an applView object 202.

Block 404 represents the application program 106 instantiating the requested applView object 202 in the memory of the server computer 102.

Block 406 represents the dbdView objects 204 of the objects framework 108 being instantiated in the memory of the server computer 102. Usually, this occurs either when the objects framework 108 is loaded or when the application program 106 first requests an applView object 202.

Block 408 represents the application program 106 instantiating the iterator object 210 in the memory of the server computer 102 and then setting its object pointer by invoking the "evaluate" method with a DL/I™ query string.

Block 410 represents the application program 106 invoking the "next" member function or method of the iterator object 210 to instantiate/materialize a DO 208 and/or BO 206 in the memory of the server computer 102.

Block 412 is a decision block that represents the application program 106 determining whether the requested operation is a request to retrieve a DO 208. If so, control transfers to Block 414; otherwise, control transfers to Block 416. Block 414 represents the application program 106 retrieving data from the database 112 via a method of the DO 208. Thereafter, control transfers to Block 430.

Block 416 is a decision block that represents the application program 106 determining whether the requested operation is a request to update a DO 208. If so, control transfers to Block 418; otherwise, control transfers to Block 420. Block 418 represents the application program 106 updating data in the database 112 via a method of the DO 208. Thereafter, control transfers to Block 430.

Block 420 is a decision block that represents the application program 106 determining whether the requested operation is a request to delete a DO 208. If so, control transfers to Block 422; otherwise, control transfers to Block 424. Block 422 represents the application program 106 deleting data from the database 112 via a method of the DO 208. Thereafter, control transfers to Block 430.

Block 424 is a decision block that represents the application program 106 determining whether the requested operation is a request to insert a DO 208. If so, control transfers to Block 426; otherwise, control transfers to Block 430. Block 426 represents the application program 106 creating or instantiating a new DO 208 and Block 428 represents the application program 108 inserting data into the database 112 via a method of the DO 208. Thereafter, control transfers to Block 430.

Block 430 represents the application program 108 building a response to the input message from the results of the prior operations.

Syntax Format

FIG. 5 is a diagram that illustrates the syntax for creating a DL/I™ query string according to the preferred embodiment of the present invention. The following describes each parameter in the DL/I™ query string:

CLASS—The class name of the DO 208, which identifies the segment name in the database 112 that is the target of the search.

DBVIEWNAME—The name of the program communication block (PCB) that uses the desired view of the database 112.

CLASS.FIELD—The field name within the segment that is to be searched.

REL_OP—One of the following relational operators:
= or EQ
> or GT
>= or => or GE
< or LT
<= or =< or LE
!= or =! or NE LOG_OP—One of the following logical operators:
| or + or OR
& or * or AND %W—A data type specifier. Table 1 describes the data types supported for W in the preferred embodiment of the present invention, although other data types could be supported as well.

Note that "applView.evaluate" includes a "valx" for every "CLASS.FIELD" specified in the DL/I™ query string, where x is an identifier and the "valx" are ordered according to the order of "CLASS.FIELD" in the DL/I™ query string. Each "valx" is a pointer to a key value that is being searched for in CLASS.FELD. Each of the "%W" identifiers indicate the data type for each "valx".

Example DL/I Query Strings

The following examples illustrate the format of DL/I™ query strings. The first example is a DL/I™ query string that uses character and character strings:

char key;
char * Lname;
char * Fname;
applView.evaluate(&msg,
 "SELECT Accounts
 FROM Eastcoast
 WHERE Accounts.namekey=%c,
 Receivable.Lastname=%s OR
 Receivable.Firstname=%s",&key,"Johnson",Fname);

The second example is a DL/I™ query string that uses short integers, integers, and character strings:

short custkey=141;
char * addr;
int phonenum=5552121
applView.evaluate(&msg,
 "SELECT Accounts
 FROM Westcoast
 WHERE Accounts.custnum=%h,
 Receivable.company=%d,
 Customer.phone=%d",&custkey,addr,&phonenum);

The third example is a DL/I™ query string that uses a structure and packed decimals:

struct X x;
char packnm[10];
applView.evaluate(&msg,
 "SELECT Accounts
 FROM Northeast
 WHERE Accounts.order=%t AND
 Payable.materials=%p",&x,packnm);

Those skilled in the art will recognize, however, that the above examples are presented only for the purposes of illustration, and that any number of different query strings could be used with the present invention.

Conclusion

This concludes the description of the preferred embodiment of the invention. The following describes some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. Instead, the present invention could be used to model other types of databases and datastores.

In summary, the present invention discloses a method, apparatus, and article of manufacture for accessing a hierarchical database. The database is modeled into an objects framework, wherein the objects framework corresponds to application views, data structures, and data defined and stored in the database. Data is retrieved from the objects framework in response to a query request received from an application program, wherein the query request conforms to a syntax that supports one or more data types used by the database system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| w | C++ Data Type | Description | COBOL Data Type |
|---|---|---|---|
| c | char w[1] | character | PIC X(1). |
|   |   |   | PIC 9(1). |
| s | char w[n] | character string | PIC X(n). where n <= 18 |
|   | char w[n + m] |   | PIC 9(n). where n <= 18 |
|   |   |   | PIC 9(n)V9(m). where (n + m) <= 18 |
| d | int w | integer (4 bytes) | PIC 9(n) COMP. where 5 <= n <= 8 |
|   |   |   | PIC 9(n)V9(m) COMP. where |
|   |   |   | 5 <= (n + m) <= 8 |
| h | short w | short (2 bytes) | PIC 9(n) COMP. where 1 <= n <= 4 |
|   |   |   | PIC 9(n)V9(m) COMP. where |

TABLE 1-continued

| w | C++ Data Type | Description | COBOL Data Type |
|---|---|---|---|
| | | | $1 <= (n + m) <= 4$ |
| t | struct w | C structure | COBOL group |
| p | char w[z], | packed decimal | PIC 9(n) COMP-3. where $n < = 31$ |
| | where $z = (n + 1)/2$ | | PIC 9(n)V9(m) COMP-3. $(n + m) <= 31$ |
| | or $(n + m + 1)/2$ | | |

What is claimed is:

1. A computer-implemented method for accessing a database, comprising the steps of:

(a) modeling a database system into an objects framework, wherein the objects framework includes a root object, one or more application view objects, one or more database definition view objects, one or more business objects and one or more data objects for data defined and stored in the database system, and an iterator object is used to point to an incrementally-materialized collection of the business objects and data objects that satisfy a query request from an application program; and (b) retrieving data from the data objects in the objects framework in response to the query request received from the application program, wherein the query request includes a field name to be searched and a data type value that indicates the data type for the field name.

2. The method of claim 1, wherein the query syntax includes at least one key value for the field name.

3. The method of claim 2, wherein the query syntax includes one or more relational operators between the field name and the key value.

4. The method of claim 2, wherein the query syntax includes one or more logical operators between the field name and the key value.

5. The method of claim 1, wherein the field name is identified as being within a segment of the database.

6. The method of claim 1, wherein the query syntax includes a class name that identifies a segment name in the database system for a search.

7. The method of claim 1, wherein the query syntax includes a name of a desired view of the database system for a search.

8. The method of claim 1, wherein the database comprises an IMS™ database and the query request comprises a DL/I™ query.

9. The method of clam 1, wherein the objects framework manages the data objects from creation to deletion.

10. The method of claim 1, wherein the query requests are dynamically constructed by application program.

11. A computerized apparatus for accessing a database, comprising:

(a) means for modeling a database system into an objects framework, wherein the objects framework includes a root object, one or more application view objects, one or more database definition view objects, one or more business objects and one or more data objects for dam defined and stored in the database system, and an iterator object is used to point to an incrementally-materialized collection of the business objects and data objects that satisfy a query request from an application program; and (b) means for retrieving data from the data objects in the objects framework in response to the query request received from the application program, wherein the query request includes a field name to be searched and a data type value that indicates the data type for the field name.

12. The apparatus of claim 11, wherein the query syntax is expandable to use new data types.

13. The apparatus of claim 11, wherein the query syntax includes at least one key value for the field name.

14. The apparatus of claim 13, wherein the query syntax includes one or more relational operators between the field name and the key value.

15. The apparatus of claim 13, wherein the query syntax includes one or more logical operators between the field name and the key value.

16. The apparatus of claim 11, wherein the field name is identified as being within a segment of the database.

17. The apparatus of claim 11, wherein the query syntax includes a class name that identifies a segment name in the database system for a search.

18. The apparatus of claim 11, wherein the query syntax includes a name of a desired view of the database system for a search.

19. The apparatus of claim 11, wherein the database comprises an IMS™ database and the query request comprises a DL/I™ query.

20. The apparatus of claim 11, wherein the objects framework manages the data objects from creation to deletion.

21. The apparatus of claim 11, wherein the query requests are dynamically constructed by application program.

22. A program storage medium readable by a computer, the medium embodying one or more instructions executable by the computer to perform method steps for accessing a database, the method comprising the steps of:

(a) modeling a database system into an objects framework, wherein the objects framework includes a root object, one or more application view objects, one or more database definition view objects, one or more business objects and one or more data objects for data defined and stored in the database system, and an iterator object is used to point to an incrementally-materialized collection of the business objects and data objects that satisfy a query request from an application program; and (b) receiving data from the data objects in the objects framework in response to the query request received from the application program, wherein the query request includes a field name to be searched and a data type value that indicates the data type for the field name.

23. The method of claim 22, wherein the query syntax is expandable to use new data types.

24. The method of claim 22, wherein the query syntax includes at least one key value for the field name.

25. The method of claim 24, wherein the query syntax includes one or more relational operators between the field name and the key value.

26. The method of claim 24, wherein the query syntax includes one or more logical operators between the field name and the key value.

27. The method of claim 22, wherein the field name is identified as being within a segment of the database.

28. The method of claim 22, wherein the query syntax includes a class name that identifies a segment name in the database system for a search.

29. The method of claim 22, wherein the query syntax includes a name of a desired view of the database system for a search.

30. The method of claim 22, wherein the database comprises an IMS™ database and the query request comprises a DL/I™ query.

31. The method of claim 22, wherein the objects framework manages data objects from creation to deletion.

32. The method of claim 22, wherein the query requests are dynamically constructed by application program.

* * * * *

UNITED STATES PATENT AND TRADEMARK OFFICE
CERTIFICATE OF CORRECTION

PATENT NO. : 6,421,661 B1
DATED : July 16, 2002
INVENTOR(S) : Bach Dinh Doan and Shyh-Mei Fang Ho It is certified that error appears in the above-identified patent and that said Letters Patent is hereby corrected as shown below:

<u>Column 17,</u>
Line 60, "dam" should read -- data --.

<u>Column 18,</u>
Line 55, "receiving" should read -- retrieving --.

Signed and Sealed this

Eighteenth Day of November, 2003

JAMES E. ROGAN
*Director of the United States Patent and Trademark Office*